Feb. 12, 1935.  E. C. EBERTS  1,990,779
PROCESS OF PRODUCING FRUIT JUICES, MORE PARTICULARLY CITRUS FRUITS
Filed Nov. 19, 1932
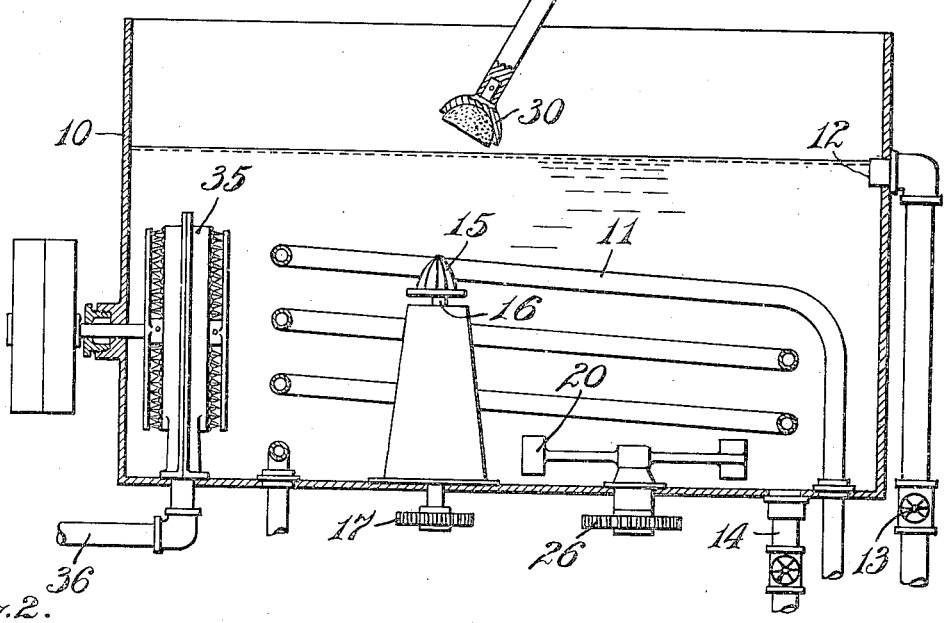
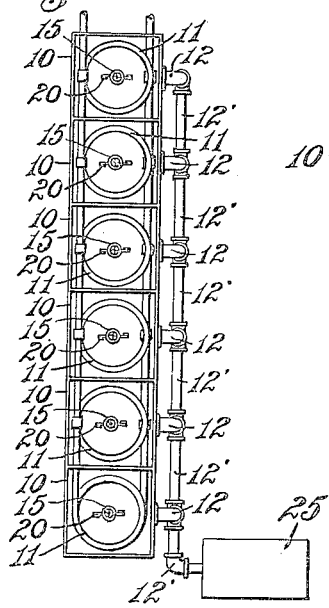
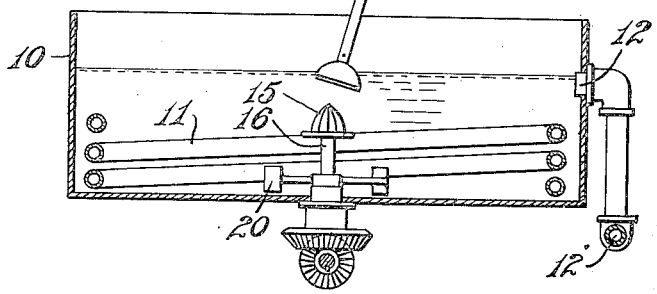
INVENTOR.
Edward C. Eberts,
BY
Hood & Hahn,
ATTORNEYS Patented Feb. 12, 1935

1,990,779

UNITED STATES PATENT OFFICE 1,990,779

PROCESS OF PRODUCING FRUIT JUICES, MORE PARTICULARLY CITRUS FRUITS

Edward C. Eberts, Jeffersonville, Ind.

Application November 19, 1932, Serial No. 643,409

3 Claims. (Cl. 99—14)

The object of my invention is to extract juices from fruits, more particularly citrus fruits, by an improved method, whereby the freshly extracted juice will be protected, to an extent heretofore found commercially impossible, against the usual rapid deterioration of flavor and odor and whereby the extracted juice, when preserved at or below a freezing temperature will retain, throughout the period of maintenance of such temperatures over a long period and during a reasonable thawing and consumption period, original flavors and odors to a much greater degree than has heretofore been found possible.

It has heretofore been known, and quite generally recognized, where attempts have been made to preserve citrus fruit juices by freezing, that great care must be exercised, first: in a proper cleansing of the fruit before juice extraction, second: in careful avoidance of oil extraction from the skins and mixture thereof with the extracted juices, third: to avoid, as much as possible absorption of air by the freshly extracted juices. It has also been long known that freezing preservation of such juices, when extracted by the ordinary burring or pressure methods, may be materially improved by de-aeration of the juices, and protection thereof from the atmosphere by vacuum sealing, with or without blanketing with an inert gas.

Previous methods of juice extraction from fruits of this kind have involved either the burring of juice and pulp from the skin of halved fruits or the expression of juices and pulp from the peeled fruit and in the practice of either of these methods there is an unavoidable exposure, to a very considerable extent, of the fresh juice to the atmosphere and at relatively high temperatures, i. e., temperatures generally considerably above seventy degrees F.

While all of the causes of rapid juice deterioration are not thoroughly understood, it seems to be generally accepted that a very large part of the flavor and color deterioration is due to oxidation and/or enzymic activity.

It has been thought that juice deterioration might be decreased by pre-cooling the fruit and the probabilities are that such pre-cooling may be slightly beneficial, but neither enzymic activity nor oxidation seem to be materially decreased by a lowering of temperature below normal summer atmospheric temperatures down to the neighborhood of, but above, freezing and of course juice extraction cannot be accomplished, either by burring or pressure if the fruits have been previously frozen.

The production of juice of fruits of this type, either by burring or pressure, results in rupturing the fruit cells and thereby releasing the enzymes.

In order, therefore, to extract the juices of raw fruits with all of the facility due to normal atmospheric temperature materially above freezing and at the same time to subject the enzymes to inactivating temperatures, and to promptly protect the freshly released juices from contact with the air, the fundamental step of my improved process resides in the extraction or release of the juice from its natural sacs or cellular walls after and during complete submergence of the fruit in a bath of the same juices maintained at a substantial subnormal temperature approximating the temperature at which ice crystal formation initiates.

To this end my improved process involves the establishment and maintainance of a bath of fresh juice (and pulp) of substantial volume and depth and at substantially a freezing temperature but not so low as to solidify the bath, said bath preferably being in a slightly mushy condition resulting from partial congelation.

The fresh fruit, previously cleaned and prepared in any desired manner to facilitate juice extraction, is then so manipulated as to free its juices beneath the surface of the bath, whereby the fresh juice is, at the moment of its freedom, subjected to rapid cooling and simultaneously protected from the atmosphere.

In order to accomplish the desired result many different forms of mechanisms may be provided to facilitate the practice of the above-described step of manipulation and in the accompanying drawing—

Fig. 1 illustrates diagrammatically one form of such mechanism; and

Fig. 2 a plan of a battery of juicers which may be used in the practice of my improved process; and Fig. 3 a vertical section of one element of said battery.

In the drawing 10 indicates a vat or tank of suitable material which will not deleteriously affect the juice and in which a bath of suitable volume and depth of fresh juice may be maintained, a desired low bath temperature being attained by any suitable refrigerating means, such for instance as coil 11. Leading from vat 10, at a point somewhat above its bottom, is a primary pulp outlet 12 controlled by a valve 13, and also leading from the bottom of the vat in order to permit complete drainage is a secondary or drainage outlet 14.

Mounted in the lower region of the vat, below the primary outlet 12, is a burr-extractor 15 of well-known form carried by shaft 16 and rotated by suitable driving train 17.

An agitator 20 may be provided to keep the bath in movement, said agitator being preferably of a kind which will avoid, as much as possible, splashing at the surface of the bath and this agitator is driven by any suitable driving train 26.

The fresh fruit, having been first previously cleansed in a common and well-known manner, may be halved transversely of the segments and the halves placed in any suitable holder 30 by means of which it may be submerged in the bath and subjected to the action of the burr.

There may also be located in the vat a juice finisher 35 below the normal level of the bath so that it will be submerged and of such construction that the free juice and a desired quantity of finely divided pulp may be extracted from the bath, either continuously or intermittently, and delivered through pipe 36 to packaging and congealing means.

The juice finisher may be a chamber having one or more screen walls swept by brushes which will serve to finely subdivide the pulp and permit a desired proportion to pass through the screen with the juice to the packaging and congealing mechanism. It will be readily understood that the precise mechanism by means of which the fruit juice may be freed while submerged in the cold bath forms no part of my present invention and that the mechanism which I have disclosed is merely symbolic.

It will be noted that, by the practice of my improved method, the fresh juice, at the instant of its liberation from the fruit, is thoroughly protected from the atmosphere because of its submergence in the cold bath of fruit juice and that it is also discharged into said cold bath beneath the surface thereof where it is promptly subjected to heat extraction so that its temperature will be promptly lowered to about congealing temperature.

The extracted juice with its entrained pulp, may of course, be subsequently treated by desired packaging and congealing operations which should preferably be of such character as to avoid as much as possible any possibility of oxygen absorption and which may, if desired, involve oxygen extraction and/or blanketing with a neutral gas.

It will be readily understood that a substantial part of my improved process resides in the liberation of the juice at a point submerged in a bath of the juice, irrespective of the temperature of the bath, and that, where the bath itself is not maintained at a temperature approximating congelation temperature, juice may be extracted from the bath, preferably without substantial exposure to the atmosphere, and carried to congealing and packaging mechanism.

It will, of course, be understood that if desired there might be placed in the tank 10, below the normal working level, any suitable juice extractor which would also extract and expel the respectively dry pulp from the tank and it will also be understood that instead of attempting to separate the juice and desired entrained pulp from the undesirable pulp within the tank 10, the contents of the tank, above the normal working level, may be currently extracted as a unit from the tank through the pipe 12 and carried to suitable separating means.

Referring to Figs. 2 and 3: In the tank 10 is a refrigerating coil 11 and a burr juicer 15 carried at the upper end of shaft 16 which also carries the agitator 20 and driven by suitable gearing. Leading from the tank 10 at a point somewhat above the burr 15 is the discharge pipe 12 which leads to a header 12' leading to a suitable unit 25. As indicated in Fig. 2, this juice extracting separator may be arranged in a battery where operators may subject the fruit to the above-described manipulation to extract the juice therefrom.

I claim as my invention:

1. A method of fresh fruit juice extraction comprising the step of liberation of the fresh juices within and beneath the surface of a bath of said juice maintained at a temperature approximating congelation temperature of the liberated juices.

2. The method of treating citrus fruits which comprises the establishment and maintenance of a dominant pool of free juice of such fruit in fluid condition at a temperature closely approximating congelation thereof, submerging cut portions of such fruit in said dominant pool, thereafter liberating the juice from the rind while submerged, withdrawing the rinds from said dominant pool, extracting desired quotas of juice from a submerged region of said pool, and promptly packaging the same while at subnormal temperature.

3. A method of fruit juice extraction comprising the step of liberation of the fresh juices within and beneath the surface of, a dominant pool of such juices maintained at a subnormal temperature closely approximating congelation temperature, and the step of separation of desired quotas of juice from a submerged region of said dominate pool.

EDWARD C. EBERTS.